United States Patent
Im et al.

(10) Patent No.: US 8,289,489 B2
(45) Date of Patent: Oct. 16, 2012

(54) FRINGE-FIELD-SWITCHING-MODE LIQUID CRYSTAL DISPLAY AND METHOD OF MANUFACTURING THE SAME

(75) Inventors: Moo Shik Im, Icheon-Si (KR); Dong Hae Seo, Seoul (KR); Dae Lim Choi, Yongin-Si (KR); Jong Kyun Park, Icheon-Si (KR); Soo Young Choi, Icheon-Si (KR)

(73) Assignee: Hydis Technologies Co., Ltd., Icheon-Si (KR)

( * ) Notice: Subject to any disclaimer, the term of this patent is extended or adjusted under 35 U.S.C. 154(b) by 510 days.

(21) Appl. No.: 12/692,173

(22) Filed: Jan. 22, 2010

(65) Prior Publication Data

US 2011/0037931 A1 Feb. 17, 2011

(30) Foreign Application Priority Data

Aug. 17, 2009 (KR) .................. 10-2009-0075664
Oct. 9, 2009 (KR) .................. 10-2009-0095936

(51) Int. Cl.
*G02F 1/1343* (2006.01)
(52) U.S. Cl. ......... 349/143; 349/113; 349/139; 349/147
(58) Field of Classification Search .................. None
See application file for complete search history.

(56) References Cited

U.S. PATENT DOCUMENTS

| 2003/0184699 | A1* | 10/2003 | Matsumoto et al. .......... 349/141 |
| 2008/0180624 | A1  | 7/2008  | Choi et al. |
| 2009/0323005 | A1* | 12/2009 | Ota ............................... 349/143 |

FOREIGN PATENT DOCUMENTS

| KR | 100341123 B1 | 6/2002 |
| KR | 100849599 B1 | 7/2008 |
| KR | 100855782 B1 | 9/2008 |

* cited by examiner

*Primary Examiner* — Michelle E Connelly
(74) *Attorney, Agent, or Firm* — The Webb Law Firm

(57) ABSTRACT

Provided are a fringe-field-switching (FFS)-mode liquid crystal display (LCD) and a method of manufacturing the same. The FFS-mode LCD includes a transparent common electrode, a conductive reflection structure electrically connected to the transparent common electrode, and a transparent pixel electrode formed on the conductive reflection structure and including a plurality of slits. The transparent common electrode is formed on a region including a data line and a gate line so that respective unit pixel regions can be electrically connected to one another.

16 Claims, 15 Drawing Sheets

FRINGE-FIELD-SWITCHING-MODE LIQUID CRYSTAL DISPLAY AND METHOD OF MANUFACTURING THE SAME

CROSS-REFERENCE TO RELATED APPLICATION

This application claims priority to and the benefit of Korean Patent Application No. 2009-0075664 filed on Aug. 17, 2009 and Korean Patent Application No. 2009-0095936 filed on Oct. 9, 2009, the disclosure of which is incorporated herein by reference in its entirety.

BACKGROUND

1. Field of the Invention

The present invention relates to a fringe-field-switching (FFS)-mode liquid crystal display (LCD), which increases an aperture ratio and an internal reflectance to improve outdoor visibility, and a method of manufacturing the same.

2. Discussion of Related Art

In general, a FFS-mode LCD has been proposed to improve the aperture ratio and transmittance of an in-plane-switching (IPS)-mode LCD.

A FFS-mode LCD may include a common electrode (or counter electrode) and a pixel electrode, which are formed of transparent conductive materials, to increase an aperture ratio and a transmittance compared to an IPS-mode LCD. Also, a distance between the common electrode and the pixel electrode may be controlled to be smaller than a distance between upper and lower glass substrates so that a fringe field can be formed between the common electrode and the pixel electrode. Thus, every liquid crystal (LC) molecule present on the electrodes may be operated, thereby improving a transmittance.

Conventional FFS-mode LCDs have been disclosed in, for example, Korean Patent Nos. 341123, 855782, and 849599 filed and registered by the present applicant.

Looking at some of the above-described Patents, Korean Patent No. 855782 discloses a FFS-mode LCD including a transparent common electrode and a transparent pixel electrode disposed over the transparent common electrode with an insulating layer therebetween. In the FFS-mode LCD, a direction in which a LC layer is rubbed may be within 5° based on a direction of a gate line, one end of the transparent common electrode may be disposed between a data line and the transparent pixel electrode, and a distance between the transparent common electrode and the transparent pixel electrode may be controlled based on the data line to improve an aperture ratio and a light transmittance around the data line.

Also, Korean Patent No. 849599 discloses a FFS-mode LCD in which the widths and arrangements of a data line, a transparent common electrode and a transparent pixel electrode around the data line are controlled such that LC around the data line may be driven in a different LC drive mode from LC drive mode in the center of a pixel region. Thus, a light shielding layer formed over the data line may be removed, and light leakage may be prevented.

The FFS-mode LCDs disclosed in Korean Patent Nos. 855782 and 849599 may increase outdoor visibility and an aperture ratio and enable low-power operations. However, some problems to improve performance still remain unsolved.

First, a margin required for alignment with upper and lower plates may be reduced due to reduction or removal of light shielding layers. It may cause a mixture of colors, and thereby increasing a failure rate. According to Korean Patent No. 849599, rubbing may be incompletely performed in a stepped portion of a data line. From this incompletion of rubbing, light leakage may occur in the stepped portion of the data line, especially data line side of opposite to rubbing direction.

Accordingly, it is still required to develop a new FFS-mode LCD to solve the above-described problems.

SUMMARY OF THE INVENTION

The present invention is directed to a fringe-field-switching (FFS)-mode liquid crystal display (LCD) having a new stack structure and design.

Also, the present invention is directed to a FFS-mode LCD, which remove or minimize light shielding layers formed over the data line to improve an aperture ratio and reduce power consumption.

In addition, the present invention is directed to a FFS-mode LCD in which a conductive reflection region is foamed on a region (e.g., a gate line and a data line) other than a transmission region as much as possible to maximize the area of a reflection region, in order to enhance outdoor visibility.

Furthermore, the present invention is directed to a FFS-mode LCD, which minimizes light leakage and a mixture of colors to improve screen quality.

According to an aspect of the present invention, there is provided a fringe-field-switching (FFS)-mode liquid crystal display (LCD) comprising a lower substrate, an upper substrate, and a liquid crystal (LC) layer interposed between the lower and upper substrates, wherein respective pixel regions are defined on the lower substrate by a gate line and data lines intersecting each other, and a switching device including a drain electrode, a source electrode, and a channel region is disposed at each of intersections between the gate line and the data lines, the FFS-mode LCD comprising: a transparent common electrode disposed over the entire region including the gate line and the data lines with at least a first interlayer insulating layer interposed therebetween; a conductive reflection structure connected to the transparent common electrode and disposed over the data line and the gate line including a portion of the switching device; and a transparent pixel electrode disposed in each of the pixel regions over the transparent common electrode and the conductive reflection structure with at least a second interlayer insulating layer therebetween, including a plurality of slits, and electrically connected to the drain electrode of the switching device.

The conductive reflection structure may overlap at least a portion of an edge region of the drain electrode.

The plurality of slits of the transparent pixel electrode may form a predetermined angle with the gate line, and a direction in which the LC layer is rubbed may be substantially parallel to a direction of the gate line.

The conductive reflection structure may cover the switching device except a partial region of the drain electrode of the switching device in order to electrically connect the transparent pixel electrode with the drain electrode of the switching device.

The conductive reflection structure may cover the switching device except a portion of the drain electrode and a channel region of the switching device.

According to another aspect of the present invention, there is provided a method of manufacturing a fringe-field-switching (FFS)-mode liquid crystal display (LCD) comprising a lower substrate, an upper substrate, and a liquid crystal (LC) layer interposed between the lower and upper substrates, wherein respective pixel regions are defined on the lower substrate by a gate line and data lines intersecting each other, and a switching device including a drain electrode, a source electrode, and a channel region is disposed at each of intersections between the gate line and the data lines, the method comprising: forming a gate line and a gate electrode on the lower substrate; forming a gate insulating layer on the lower substrate having the gate line and the gate electrode; forming the switching device including the drain electrode, the source electrode, and the channel region and the data line on the gate insulating layer; forming a transparent common electrode on the entire resultant structure including the switching device and the data line except a portion of the switching device with at least a first insulating layer interposed therebetween; forming a conductive reflection structure over the data line, the gate line, and a partial region of the switching device to be electrically connected to the transparent common electrode; and forming a transparent pixel electrode in each of the pixel regions on the resultant structure including the conductive reflection structure with at least a second insulating layer interposed therebetween, the transparent pixel electrode including a plurality of slits and electrically connected to the drain electrode of the switching device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

A liquid crystal display (LCD) according to exemplary embodiments of the present invention may include a lower substrate, an upper substrate, and a liquid crystal (LC) layer inserted between the lower and upper substrates, and pixel regions may be defined on a lower substrate by a gate line and data lines formed to intersect each other in order to apply a voltage to the LC layer.

Figure 1:
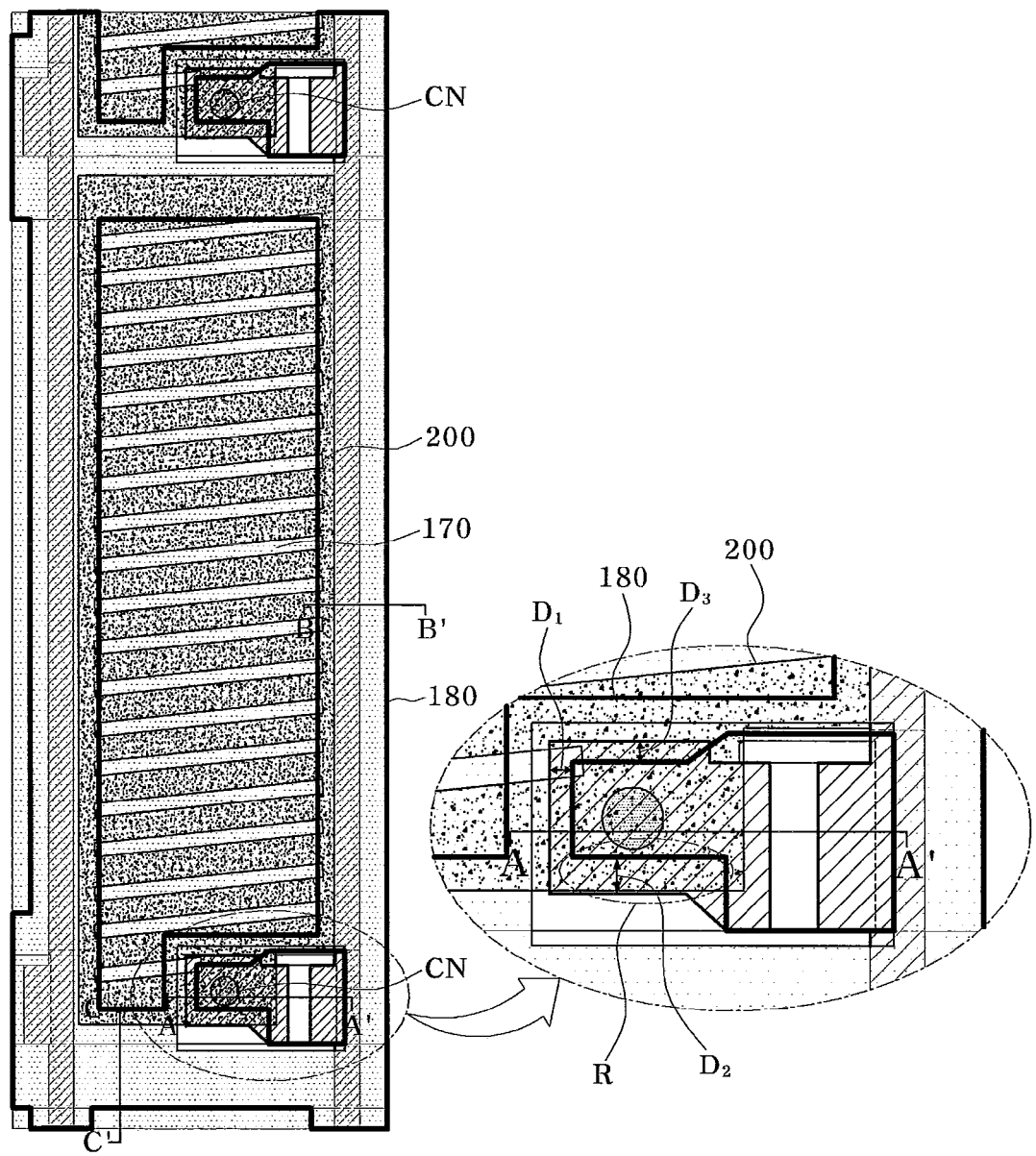
FIG. 1 is a plan view of a pixel region formed on a lower substrate of a liquid crystal display (LCD) according to an exemplary embodiment of the present invention.
Figure 2A:
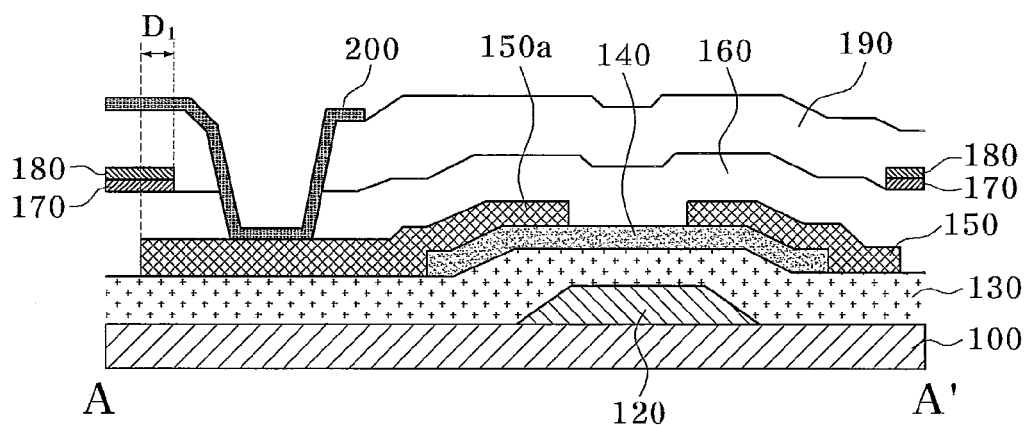
FIGS. 2A through 2C are cross-sectional views taken along lines A-A', B-B', and C-C' of FIG. 1, respectively.
Figure 2B:
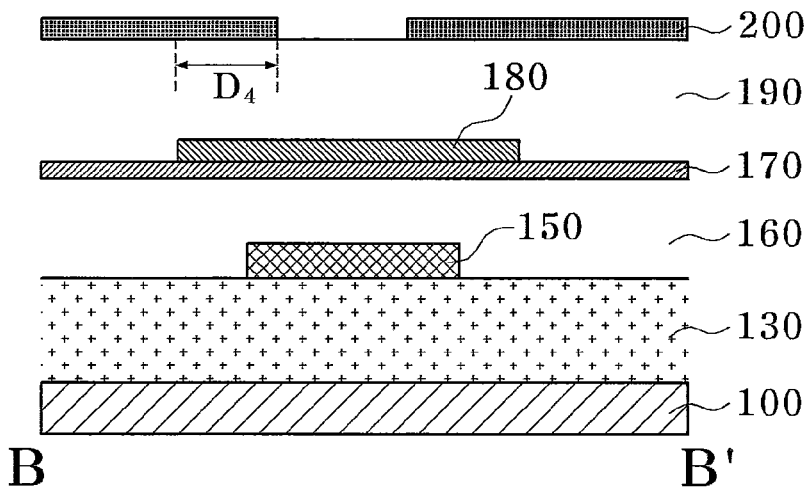
Figure 2C:
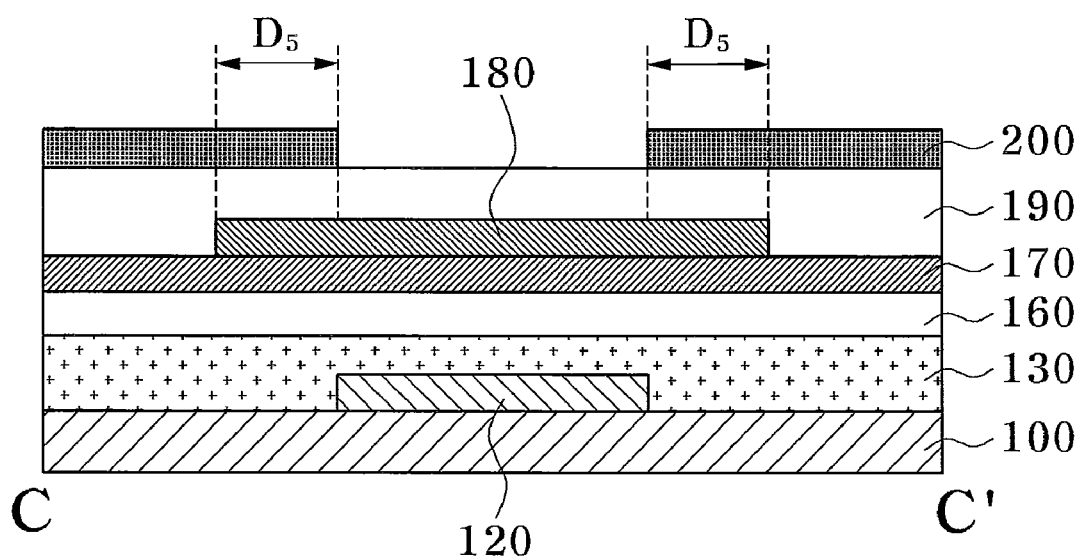

FIG. 1 is a plan view of a pixel region formed on a lower substrate of a LCD according to an exemplary embodiment of the present invention. FIGS. 2A through 2C are cross-sectional views taken along lines A-A', B-B', and C-C' of FIG. 1, respectively.

Referring to FIGS. 1 and 2A through 2C, a FFS-mode LCD according to the present embodiment may include a gate line 120 and a data line 150 arranged on a lower substrate 100 to intersect each other, and a thin-film transistor (TFT) functioning as a switching device may be disposed at an intersection between the gate line 120 and the data line 150.

A transparent common electrode 170 and a transparent pixel electrode 200 may be disposed in each unit pixel region defined by the gate line 120 and the data line 150 with an interlayer insulating layer 190 interposed therebetween. The transparent pixel electrode 200 may be a slit-type electrode including a plurality of slits formed in a direction toward the data line 150. Although the shape of the transparent common electrode 170 is not specifically limited, the transparent common electrode 170 may have a plate shape.

Also, a conductive reflection structure 180 may be disposed on the transparent common electrode 170 and be electrically connected to the transparent common electrode 170 to improve a reflectance and an aperture ratio.

An upper substrate (not shown) may be formed a predetermined distance apart from the lower substrate 100 over the lower substrate 100. The upper substrate may include a color filter and an overcoat and be bonded to the lower substrate 100 with a LC layer including a plurality of LC molecules interposed therebetween.

The present embodiment may be mainly characterized by the arrangement of the transparent common electrode 170, the transparent pixel electrode 200, and the conductive reflection structure 180. Thus, not only the shapes of the transparent common electrode 170 and the transparent pixel electrode 200 but also a stack structure and arrangement of the gate line 120, the data line 150, and interlayer insulating layers 160 and 190 may be appropriately optimized, thereby maximally realizing the object of the present invention.

In particular, the transparent common electrode 170 may not be formed as an isolated type in each unit pixel region but may be formed on the entire region including the data line 150 and the gate line 120 except a partial region (refer to FIG. 3D) of the switching device (TFT) (or drain electrode 150a). That is, the transparent common electrode 170 may not be formed on the partial region (refer to FIG. 3D) of the switching device (or drain electrode 150a) because the partial region of the drain electrode 150a will be subsequently electrically connected to the transparent pixel electrode 200.

The above-described structure may be advantageous for a large-size LCD because a resistance is reduced when a external voltage is applied to each unit pixel region through the transparent common electrode 170. In the present embodiment, the arrangement and stacked positions of the transparent common electrode 170, the transparent pixel electrode 200, the gate line 120, the data line 150, and the interlayer insulating layers 160 and 190 may be controlled so that the transparent common electrode 170 may be formed as a single body throughout the entire lower substrate 100.

In the present embodiment, the gate line 120, a gate insulating layer 130, an active layer 140, and the data line 150 may be formed on the lower substrate 100, and the transparent common electrode 170 may be formed on the entire surface of the lower substrate 100 having the gate line 120, the gate insulating layer 130, the active layer 140, and the data line 150 with the interlayer insulating layer 160 interposed therebetween. The conductive reflection structure 180 may be formed to be electrically connected to the transparent common electrode 170. The interlayer insulating layer 190 may be formed on the conductive reflection structure 180, and the transparent pixel electrode 200 may be stacked thereon.

The above-described structure may result in a large increase in the aperture ratio of the LCD.

Meanwhile, when the plurality of slits of the transparent pixel electrode 200 form a predetermined angle θ with the gate line 120 light leakage be avoided around the data line 150. In case of a direction in which the LC layer is rubbed remains substantially parallel to a direction of the gate line 120, the predetermined angle θ may be controlled to be in the range of 1 to 15 degrees.

In particular, the angle θ may be controlled in consideration of the maximum transmittance measured during the drive of the LCD and the slope of a voltage-transmittance (V-T) curve. Preferably, though not necessarily, the angle θ may be maintained at about 7 degrees.

Meanwhile, the conductive reflection structure 180 electrically connected to the transparent common electrode 170 may be formed of a material having a high reflectance, for example, aluminum (Al), an Al alloy such as aluminum-neodymium (Al—Nd), molybdenum (Mo), a Mo alloy such as molybdenum-tungsten (Mo—W), silver (Ag), a Ag alloy, W, and an alloy of at least one thereof. The conductive reflection structure 180 may be in direct contact with the transparent common electrode 170 on the transparent common electrode 170 and function to reduce the resistance of the transparent common electrode 170 and prevent light leakage and a mixture of colors while functioning as a reflection structure.

The present embodiment may optimize not only the shape of the conductive reflection structure 180 but also an arrangement relationship of the conductive reflection structure 180 with other structures, namely, the transparent common electrode 170, the transparent pixel electrode 200, the data line 150, the gate line 120, and the drain electrode 150a, thereby enabling optimization of an aperture ratio and a reflectance.

When the LCD is seen from above the LCD, the conductive reflection structure 180 may be provided to increase internal reflection of light incident to upper portions of the data line 150 and the gate line 120. Thus, the conductive reflection structure 180 may improve the internal reflection and increase an aperture ratio, thereby enhancing outdoor visibility. Meanwhile, a light shielding region may not be formed on portions of the upper substrate corresponding to the gate line 120 and the data line 150. In other words, no light shielding region may be formed on the upper substrate or a light shielding region may be formed only on a partial region of the upper substrate corresponding to the switching device.

The conductive reflection structure 180 may have a structure that each the conductive reflection structure of unit pixel region is connected to each other. That is, the conductive reflection structure 180 may be formed as a single body throughout the entire lower substrate 100. More specifically, the conductive reflection structure 180 may be electrically connected to the transparent common electrode 170 over the gate line 120 and the data line 150 and over the remaining region of the switching device other than a partial region where the conductive reflection structure 180 is not formed. According to the present embodiment, an aperture ratio, a reflection amount, and a resistance depend on the arrangement relationship of the conductive reflection structure 180 with the other structures, namely, the transparent common electrode 170, the transparent pixel electrode 200, the data line 150, the gate line 120, and the drain electrode 150a.

Figure 4:
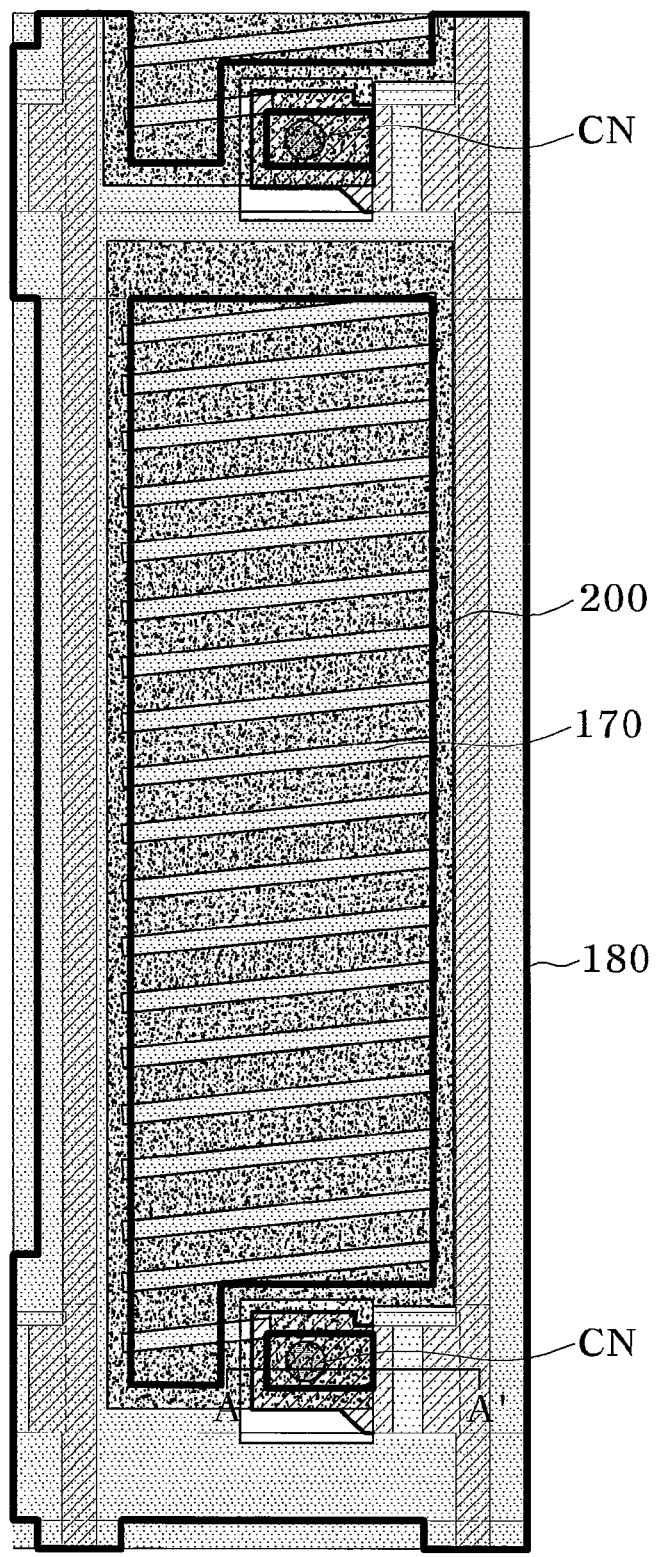
FIG. 4 is a plan view of a pixel region formed on a lower substrate of a LCD according to another exemplary embodiment of the present invention.
Figure 6:
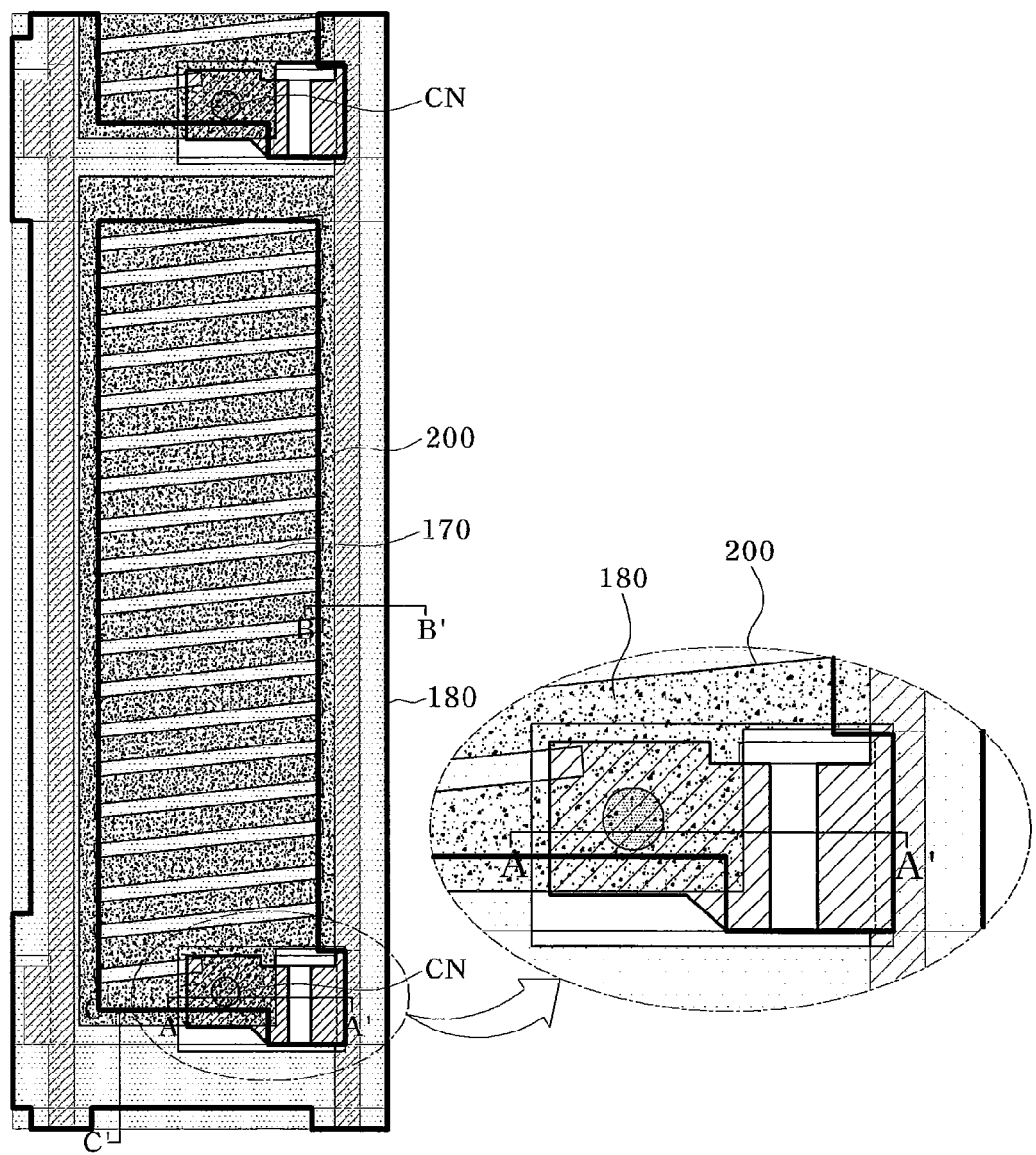
FIGS. 6 and 7 are plan views of pixel regions formed on lower substrates of LCDs according other exemplary embodiments of the present invention.
Figure 7:
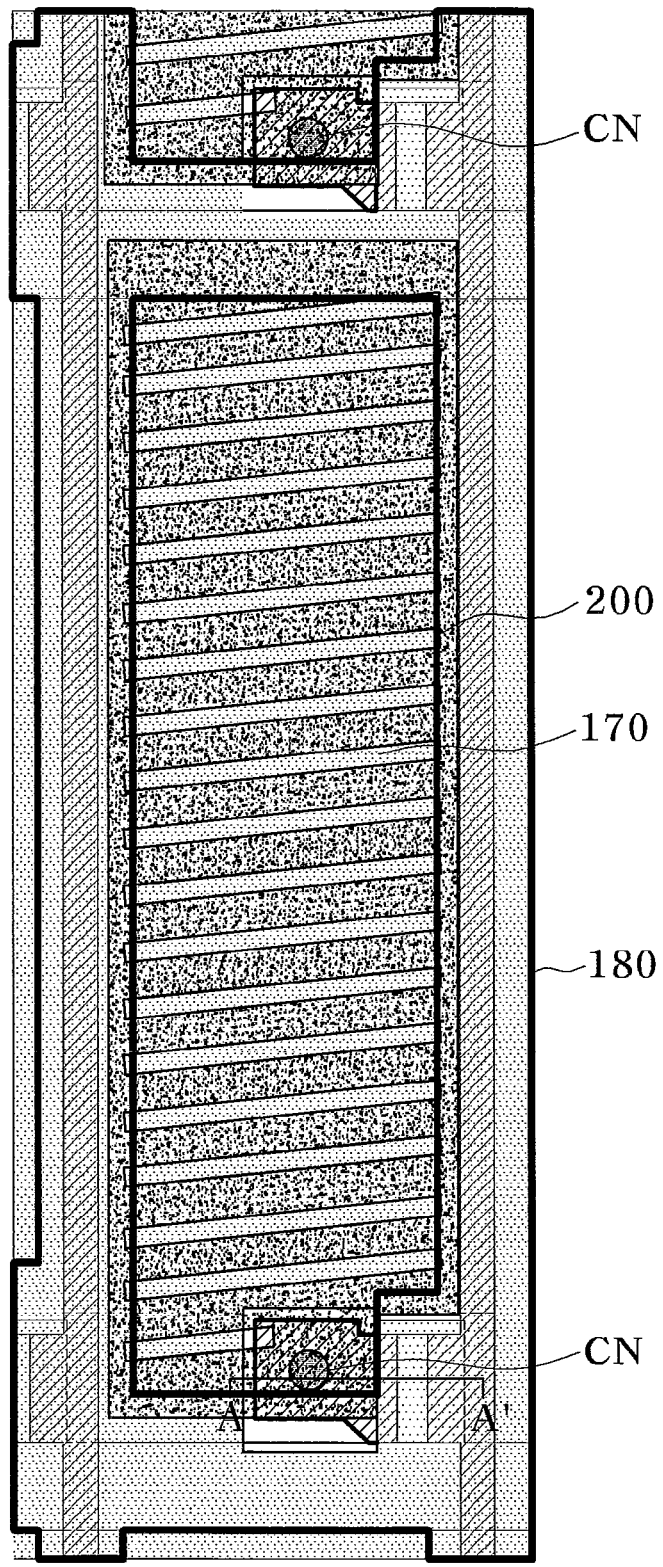

Meanwhile, the above-described arrangement relationship of the conductive reflection structure 180 with the other structures may be applied to the stack structure of the present embodiment. Specifically, the transparent common electrode 170 may be formed on the entire pixel region. In this case, the transparent common electrode 170 may not be formed on a partial region of the switching device. The conductive reflection structure 180 may be formed to be electrically connected to the transparent common electrode 170, and the transparent pixel electrode 200 including the plurality of slits may be formed on each and every unit pixel with the interlayer insulating layer 190 interposed therebetween. Referring to FIG. 4, the conductive reflection structure 180 may be formed as a lattice type over the data line 150 and the gate line 120 except a partial region of the drain electrode 150a of the switching device. Alternatively, referring to FIG. 1, the conductive reflection structure 180 may be formed as a lattice type over the data line 150 and the gate line 120 except the drain electrode 150a and a part of a channel region of the switching device. Other examples of the conductive reflection structure 180 are shown in FIGS. 6 and 7.

A relationship of the conductive reflection structure 180 with the data line 150, the gate line 120, and the drain electrode 150a will now be described in further detail. Referring to FIGS. 2B and 2C, the conductive reflection structure 180 may be configured to totally cover the data line 150 and the gate line 120 and partially overlap the transparent pixel electrode 200 (refer to D4 and D5). Distances D4 and D5 may prevent light leakage caused by a horizontal electric field generated between two adjacent pixel electrodes 200. Each of the distances D4 and D5 may be about 0.1 to 5.0 μm, more specifically, about 0.5 to 2.0 μm, in consideration of processibility.

Meanwhile, the conductive reflection structure 180 may be formed to include or cover the data line 150 and the gate line 120 in order to appropriately adjust a reflectance and a transmittance and prevent light leakage and a mixture of colors, which may occur in the vicinity of the data line 150 and the gate line 120 according to a rubbing direction due to step differences of the data line 150 and the gate line 120.

In the meantime, the conductive reflection structure 180 may overlap at least a portion of an edge region of the drain electrode 150a. In an enlarged view of FIG. 1, reference characters D1, D2, and D3 denote distances by which the conductive reflection structure 180 overlaps the edge region of the drain electrode 150a. Each of the distances D1, D2, and D3 may range from 0.5 to 5 μm in consideration of processibility. The conductive reflection structure 180 may partially overlap the edge region of the drain electrode 150a by the distances D1, D2, and D3 as shown in FIG. 1 in order to prevent light leakage that may occur due to a step difference during a process. However, the conductive reflection structure 180 may not overlap the edge region of the drain electrode 150a, and other modified exemplary embodiments are also possible as will be described later with reference to FIGS. 6 and 7.

The present inventors confirmed a case where light leakage occurred due to an unstable rubbing process performed in a portion of the gate line 120, which includes a region R of the drain region 150a of the switching device, in a direction parallel to the gate line 120. The light leakage was able to be solved by partially overlapping the conductive reflection structure 180 with the edge region of the gate line 120.

A method of manufacturing a FFS-mode LCD according to an exemplary embodiment of the present invention will be described below with reference to FIGS. 1, 2A through 2C, and 3A through 3G.

Figure 3A:
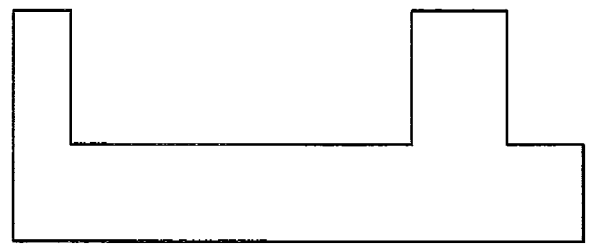
FIGS. 3A through 3G are plan views illustrating a method of manufacturing a LCD according to an exemplary embodiment of the present invention.
Figure 3A:
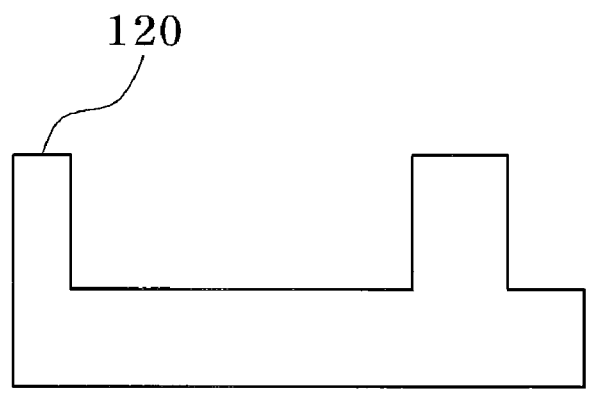

To begin, referring to FIG. 3A, a highly conductive opaque metal may be deposited on a lower substrate 100 and patterned, thereby forming a gate line 120.

Figure 3B:
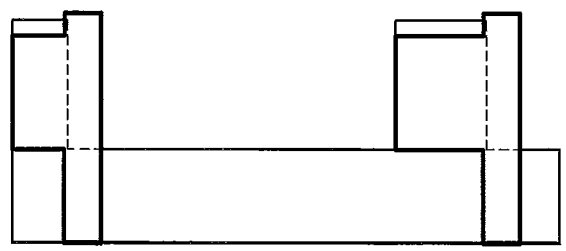
Figure 3B:
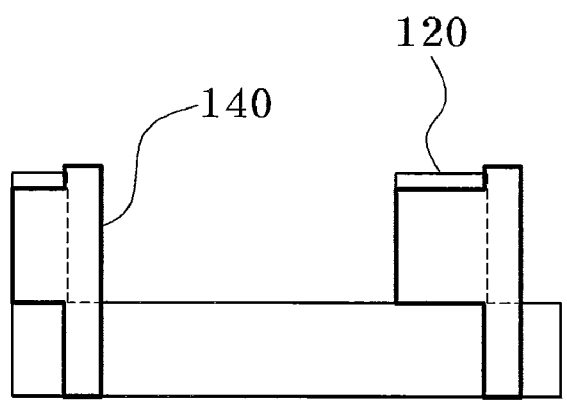

Referring to FIG. 3B, a gate insulating layer 130 may be deposited to cover the gate line 120, an amorphous silicon (a-Si) layer and an n+ a-Si layer may be sequentially deposited on the gate insulating layer 130 and patterned, thereby forming an active layer 140.

Figure 3C:
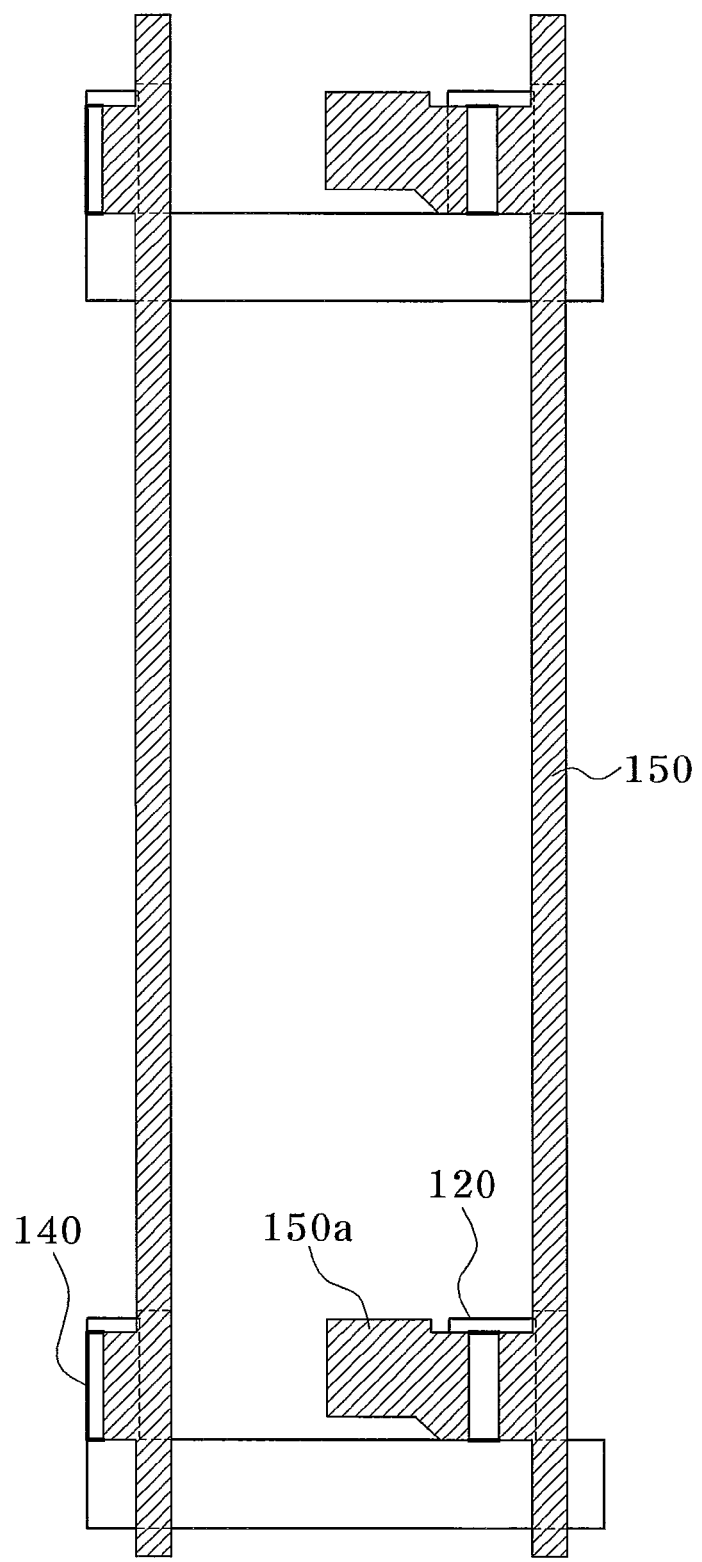

Referring to FIG. 3C, a metal layer may be deposited on the active layer 140 and patterned, thereby forming a data line 150, a source electrode 150, and a drain electrode 150a, and a first interlayer insulating layer 160 may be deposited thereon.

Figure 3D:
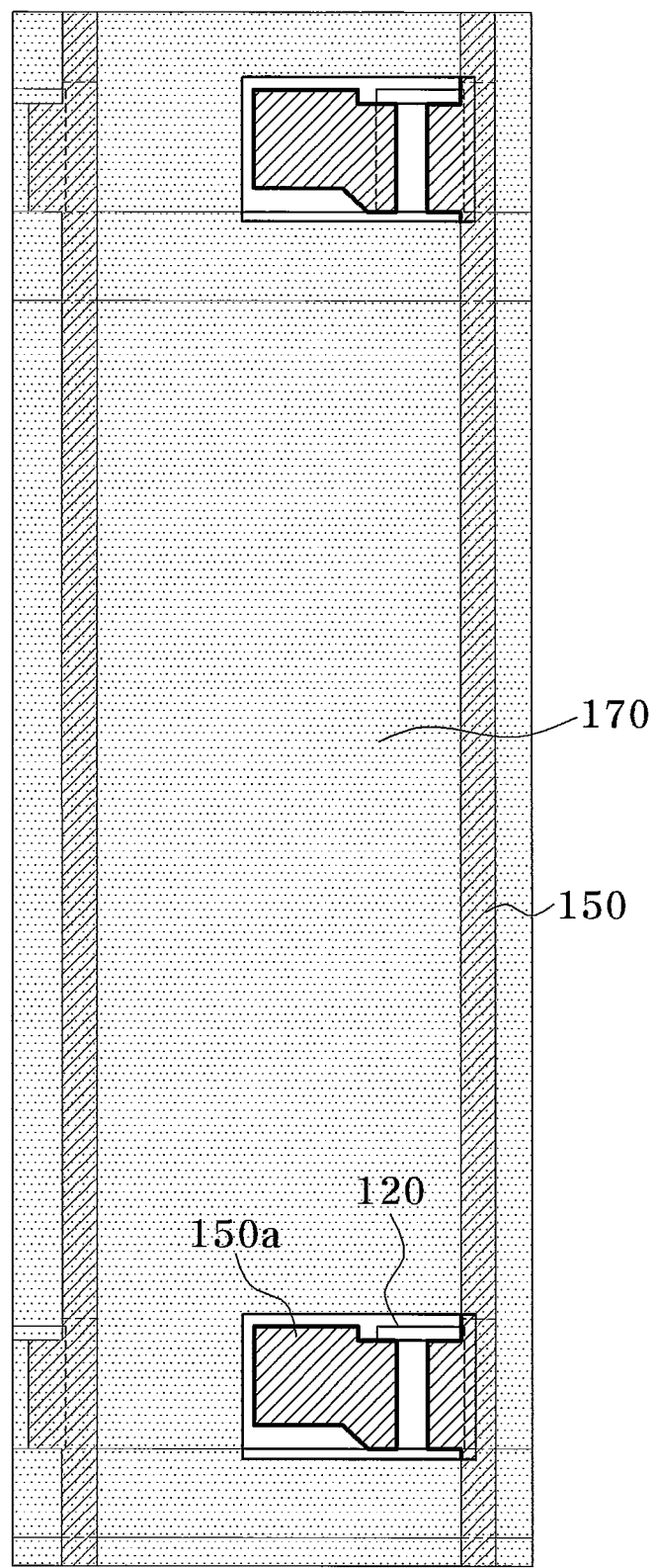

Referring to FIG. 3D, a transparent conductive layer may be deposited and patterned, thereby forming a transparent common electrode 170. In this case, the transparent common electrode 170 may be formed as a single body throughout the entire lower substrate 100 as mentioned above. As an alternative, the transparent common electrode 170 may be formed as an isolated type in each unit pixel region.

Figure 3E:
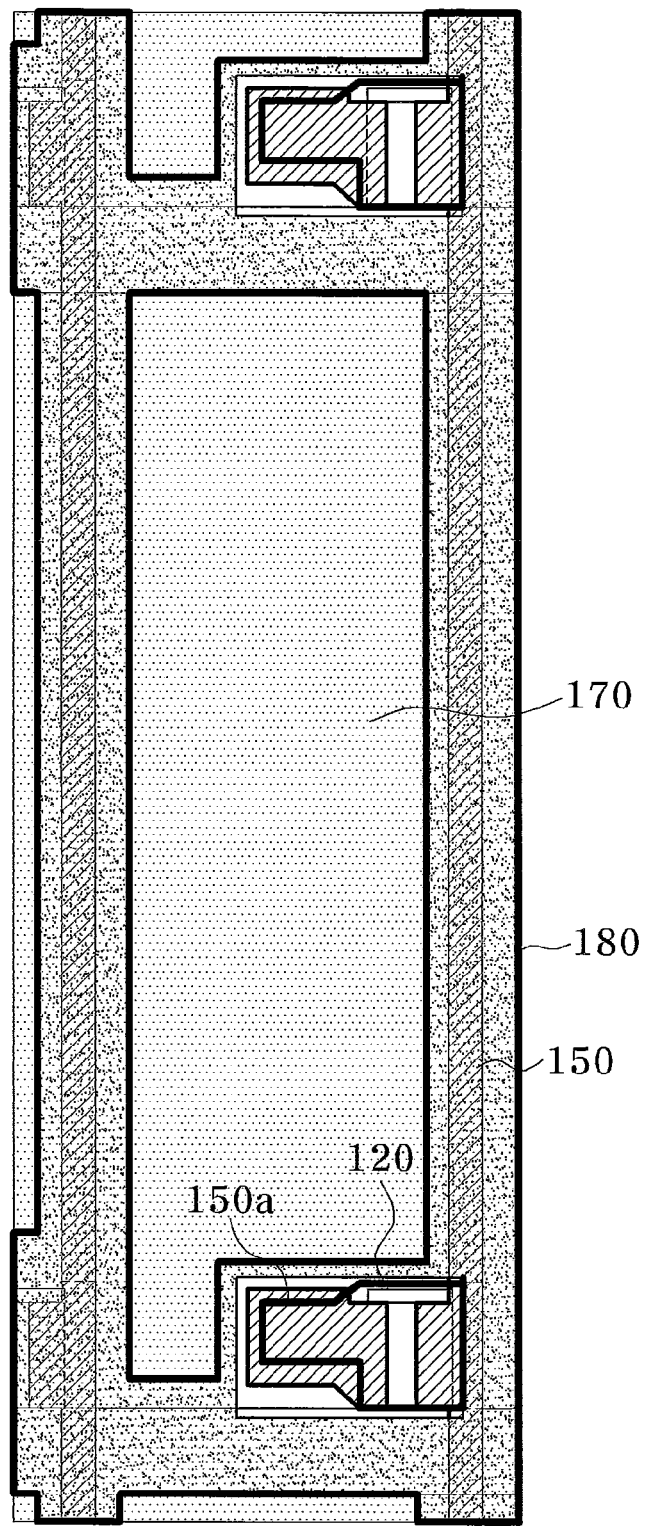

Referring to FIG. 3E, a highly reflective metal may be deposited and patterned, thereby forming a conductive reflection structure 180. The conductive reflection structure 180 may connect respective unit pixel regions to one another. The highly reflective metal may be deposited to a thickness of about 100 Å to about 7000 Å according to the resistance of the metal and patterned to form the conductive reflection structure 180.

Figure 3F:
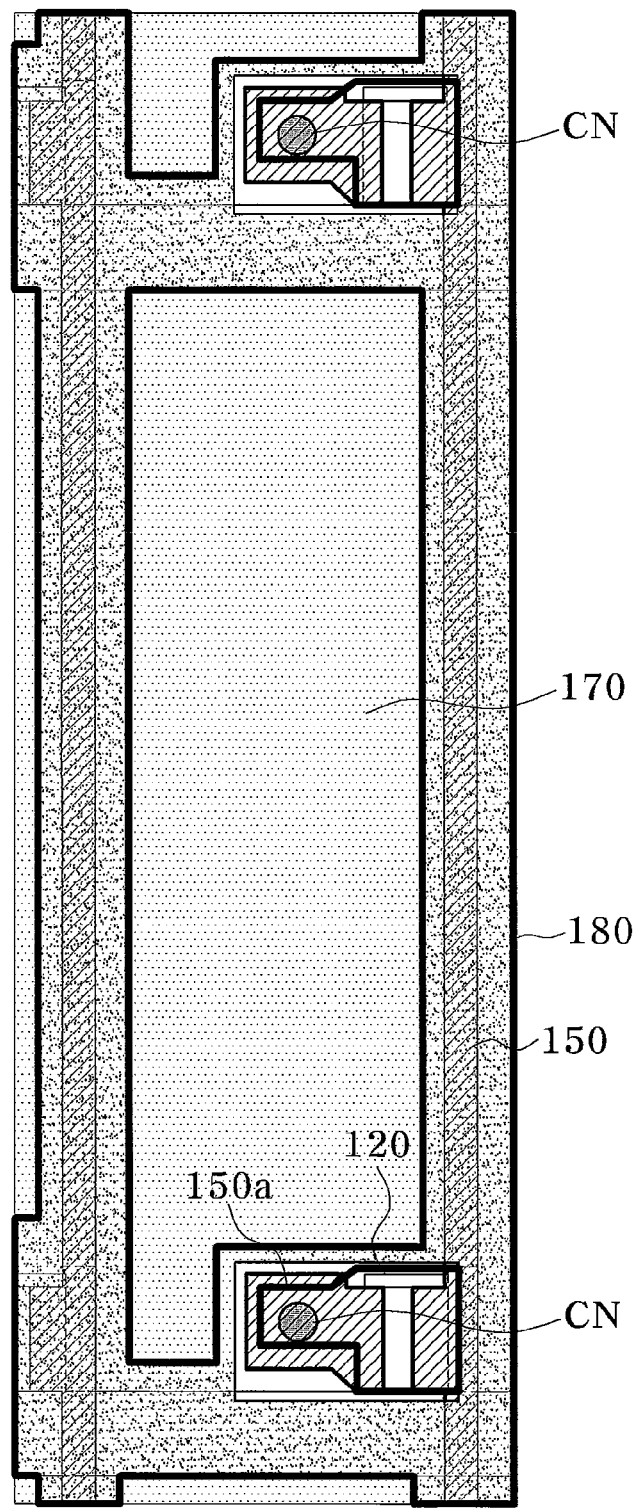

Referring to FIG. 3F, a second interlayer insulating layer 190 may be formed on the transparent common electrode 170 and the conductive reflection structure 180, and a contact hole CN may be formed to expose a portion of the drain electrode 150a. Thereafter, a transparent conductive layer may be deposited on the interlayer insulating layer 190.

Figure 3G:
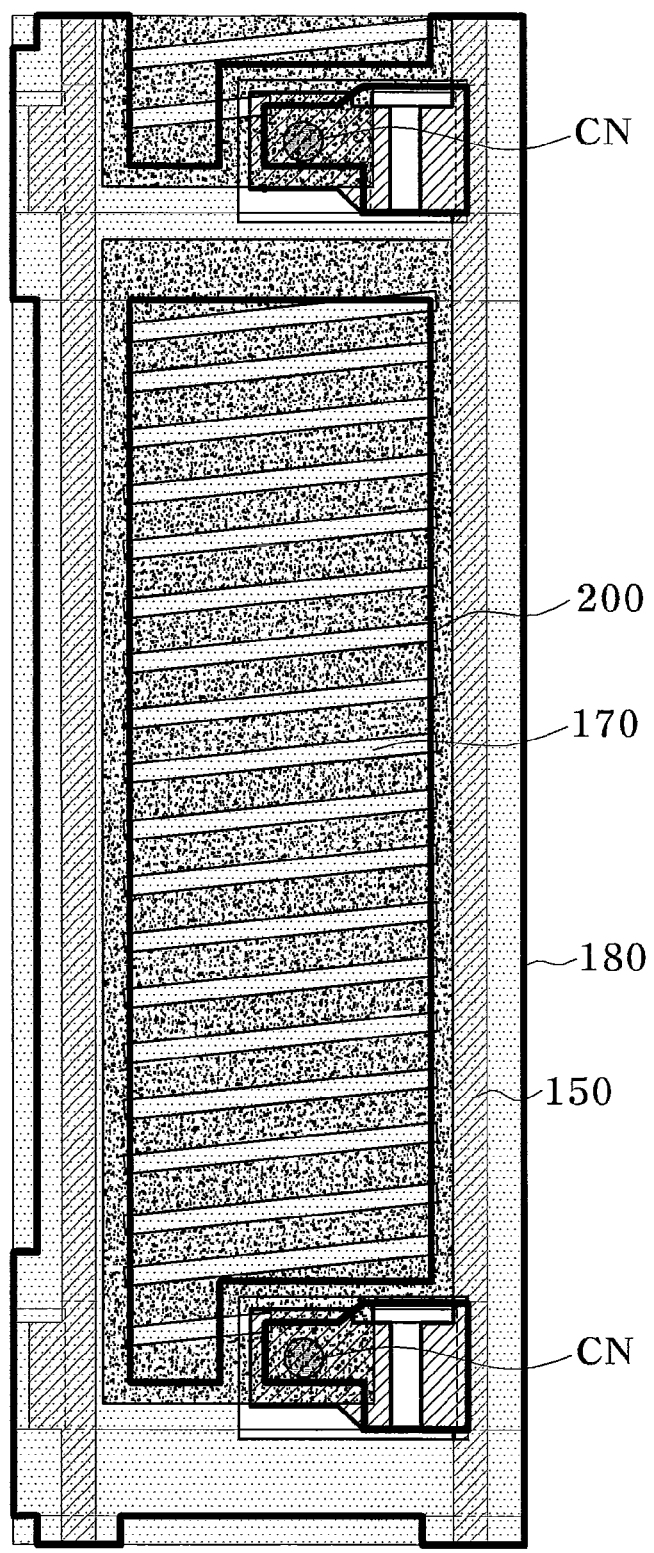

Referring to FIG. 3G, the transparent conductive layer may be patterned, thereby forming a slit-type transparent pixel electrode 200. At this time, the drain electrode 150a may be electrically connected to the transparent pixel electrode 200.

Meanwhile, although not shown, a light shielding region may be formed on an upper substrate. According to the present embodiment, a light shielding region may be formed only on a portion of the upper substrate corresponding to a switching device or no light shielding region may be provided. As compared with a conventional LCD in which light shielding regions are formed even on a gate line and a data line, in the present embodiment, no light shielding region may be formed even on a portion of the upper substrate corresponding to the data line 150 and/or the gate line 120. It is obvious that a reduction in the area of the light shielding region leads to an increase in an aperture ratio.

Figure 5A:
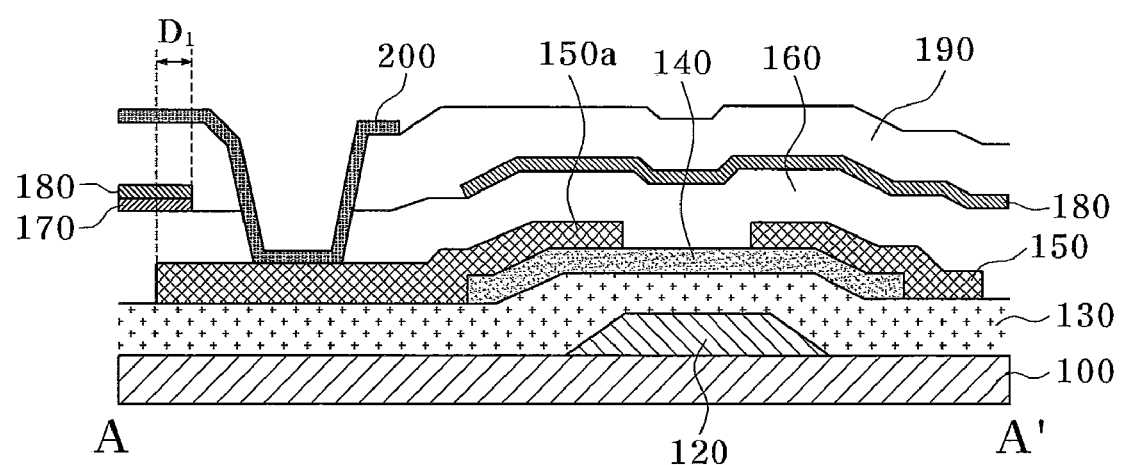
FIG. 5A is a cross-sectional view taken along line A-A' of FIG. 4.

FIG. 4 is a plan view of a pixel region formed on a lower substrate of a LCD according to another exemplary embodiment of the present invention. FIG. 5A is a cross-sectional view taken along line A-A' of FIG. 4, and FIG. 5B is a plan view illustrating a process of forming a conductive reflection structure in a method of manufacturing a LCD according to another exemplary embodiment of the present invention.

For brevity, differences between the embodiment of FIG. 4 and the embodiment of FIG. 1 will be chiefly described. The embodiment of FIG. 4 may differ from the embodiment of FIG. 1 mainly in the area of a conductive reflection structure 180.

Figure 5B:
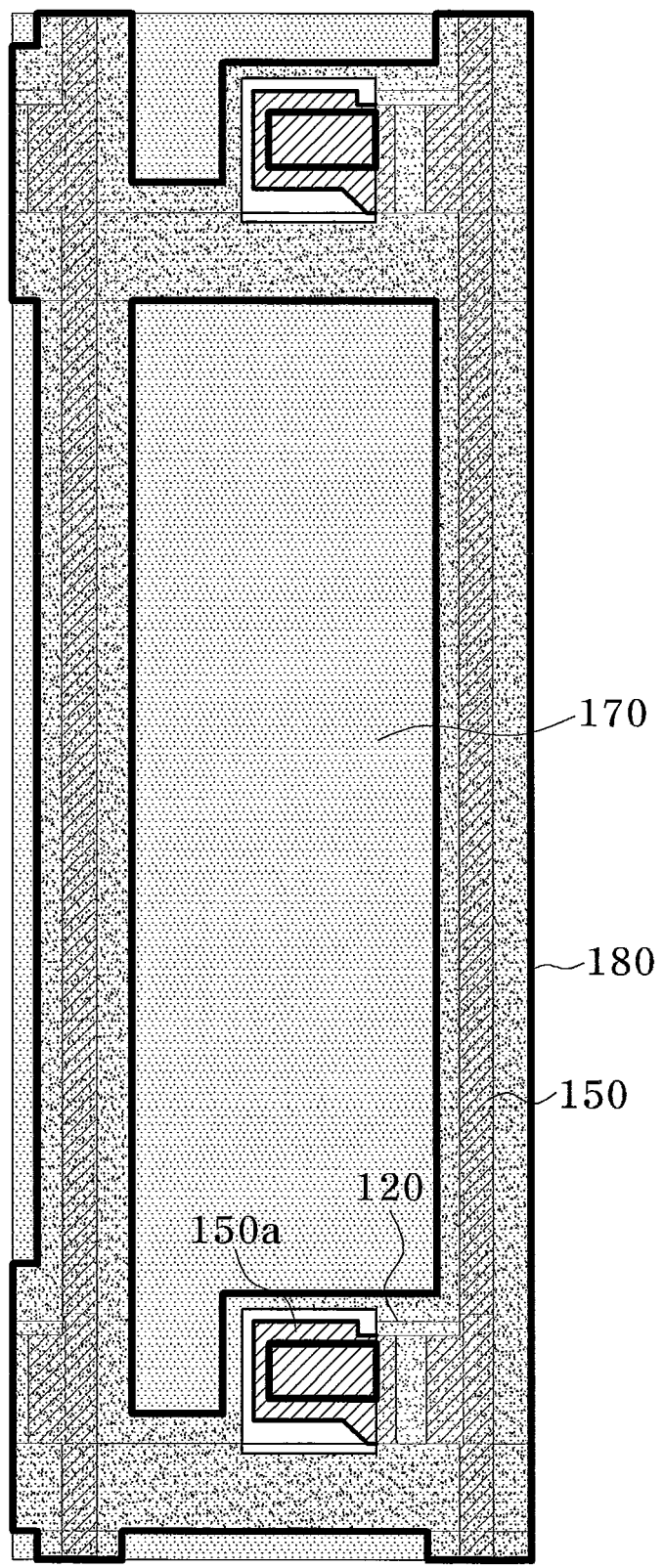
FIG. 5B is a plan view illustrating a process of forming a conductive reflection structure in a method of manufacturing a LCD according to another exemplary embodiment of the present invention.

Referring to FIGS. 4, 5A, and 5B, the conductive reflection structure 180 may cover a channel region 140 except the drain region 150a of the switching device and may be formed as a lattice type over the data line 150 and the gate line 120.

According to the present embodiment, by forming the conductive reflection structure 180 even over the channel region 140, a reflection region may be further expanded and no light shielding layer may be formed on the upper substrate at all. In other words, compared with the embodiment of FIG. 1, a region where the light shielding layer is to be formed may be further reduced. Also, disuse of a light shielding layer may be further advantageous to the embodiment of FIG. 4.

FIGS. 6 and 7 are plan views of pixel regions formed on lower substrates of LCDs according other exemplary embodiments of the present invention.

For brevity, differences between the embodiments of FIGS. 6 and 7 and the embodiments of FIGS. 1 and 4 will be chiefly described. The embodiments of FIGS. 6 and 7 may respectively differ from the embodiments of FIGS. 1 and 4 mainly in the area of a conductive reflection structure 180.

Specifically, the embodiment of FIG. 6 may differ from the embodiment of FIG. 1 in that a conductive reflection structure 180 of FIG. 6 may be formed only on a portion of an edge region of a drain electrode 150a.

Similarly, the embodiment of FIG. 7 may differ from the embodiment of FIG. 4 in that a conductive reflection structure 180 of FIG. 7 may be formed only on a portion of an edge region of a drain electrode 150a.

The embodiments of FIGS. 6 and 7 may be configured to more effectively improve an aperture ratio than in the embodiments of FIGS. 1 and 4. This is because the aperture ratio increases with a decrease in the area of the conductive reflection structure 180. However, even in the embodiments of FIGS. 6 and 7, the drain region of a switching device adjacent to a gate line may be overlapped by the conductive reflection structure to effectively prevent occurrence of light leakage as described above.

According to the present invention, arrangement of a transparent common electrode, a transparent pixel electrode, and a conductive reflection structure with a data line, a gate line, and a drain electrode may be optimized, thereby improving an aperture ratio and a reflectance.

Also, the present invention can remove or minimize light shielding layers formed over the data line to improve an aperture ratio and reduce power consumption.

Furthermore, a conductive reflection structure may be formed on a region (e.g., a gate line and a data line) other than a transmission region to maximize a reflection region, thereby improving outdoor visibility.

Moreover, according to the present invention, light leakage and a mixture of colors may be minimized, thereby improving screen quality.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fringe-field-switching (FFS)-mode liquid crystal display (LCD) comprising a lower substrate, an upper substrate, and a liquid crystal (LC) layer interposed between the lower and upper substrates, wherein respective pixel regions are defined on the lower substrate by a gate line and data lines intersecting each other, and a switching device including a drain electrode, a source electrode, and a channel region is disposed at each of intersections between the gate line and the data lines, the FFS-mode LCD comprising:

a transparent common electrode disposed over the entire region including the gate line and the data lines with at least a first interlayer insulating layer interposed therebetween;

a conductive reflection structure electrically connected to the transparent common electrode and disposed over the data line and the gate line including a portion of the switching device; and a transparent pixel electrode disposed in each of the pixel regions over the transparent common electrode and the conductive reflection structure with at least a second interlayer insulating layer therebetween, including a plurality of slits, and electrically connected to the drain electrode of the switching device.

2. The FFS-mode LCD of claim 1, wherein the conductive reflection structure is configured to cover the gate line and the data lines.

3. The FFS-mode LCD of claim 1, wherein the conductive reflection structure covers the switching device except a partial region of the drain electrode of the switching device and is formed as a lattice type over the gate line and the data lines.

4. The FFS-mode LCD of claim 1, wherein the conductive reflection structure covers the switching device except the drain electrode and a portion of the channel region of the switching device and is formed as a lattice type over the gate line and the data lines.

5. The FFS-mode LCD of claim 1, wherein the conductive reflection structure overlaps at least a portion of an edge region of the drain electrode.

6. The FFS-mode LCD of claim 1, wherein the conductive reflection structure overlaps at least a portion of the transparent pixel electrode adjacent to the gate line.

7. The FFS-mode LCD of claim 1, wherein the conductive reflection structure overlaps at least a portion of the transparent pixel electrode adjacent to the data line.

8. The FFS-mode LCD of claim 1, wherein the plurality of slits of the transparent pixel electrode form a predetermined angle with the gate line, and a direction in which the LC layer is rubbed is substantially parallel to a direction of the gate line.

9. A method of manufacturing a fringe-field-switching (FFS)-mode liquid crystal display (LCD) comprising a lower substrate, an upper substrate, and a liquid crystal (LC) layer interposed between the lower and upper substrates, wherein respective pixel regions are defined on the lower substrate by a gate line and data lines intersecting each other, and a switching device including a drain electrode, a source electrode, and a channel region is disposed at each of intersections between the gate line and the data lines, the method comprising:

forming a gate line and a gate electrode on the lower substrate;

forming a gate insulating layer on the lower substrate having the gate line and the gate electrode;

forming the switching device including the drain electrode, the source electrode, and the channel region and the data line on the gate insulating layer;

forming a transparent common electrode on the entire resultant structure including the switching device and the data line except a portion of the switching device with at least a first insulating layer interposed therebetween;

forming a conductive reflection structure over the data line, the gate line, and a partial region of the switching device to be electrically connected to the transparent common electrode; and forming a transparent pixel electrode in each of the pixel regions on the resultant structure including the conductive reflection structure with at least a second insulating layer interposed therebetween, the transparent pixel electrode including a plurality of slits and electrically connected to the drain electrode of the switching device.

10. The method of claim 9, wherein the conductive reflection structure is formed to cover the gate line and the data lines.

11. The method of claim 9, wherein the conductive reflection structure covers the switching device except a partial region of the drain electrode of the switching device and is formed as a lattice type over the gate line and the data line.

12. The method of claim 9, wherein the conductive reflection structure covers the switching device except the drain electrode and a portion of the channel region of the switching device and is formed as a lattice type over the gate line and the data line.

13. The method of claim 9, wherein the conductive reflection structure overlaps at least a portion of an edge region of the drain electrode.

14. The method of claim 9, wherein the conductive reflection structure overlaps at least a portion of the transparent pixel electrode adjacent to the gate line.

15. The method of claim 9, wherein the conductive reflection structure overlaps at least a portion of the transparent pixel electrode adjacent to the drain line.

16. The method of claim 9, wherein the plurality of slits of the transparent pixel electrode form a predetermined angle with the gate line, and a direction in which the LC layer is rubbed is maintained at a predetermined angle with a direction of the gate line.

* * * * *